United States Patent
Haefner et al.

(10) Patent No.: US 12,530,497 B1
(45) Date of Patent: Jan. 20, 2026

(54) SYSTEMS AND METHODS FOR ADVANCED IMAGE-BASED PRIVACY PRESERVATION AND PROTECTION

(71) Applicant: Cable Television Laboratories, Inc., Louisville, CO (US)

(72) Inventors: Kyle Haefner, Fort Collins, CO (US); Brian A. Scriber, Lafayette, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 135 days.

(21) Appl. No.: 18/601,624

(22) Filed: Mar. 11, 2024

Related U.S. Application Data

(60) Provisional application No. 63/437,780, filed on Jan. 9, 2023.

(51) Int. Cl.
*G06F 21/62* (2013.01)
*G06T 11/60* (2006.01)

(52) U.S. Cl.
CPC .......... *G06F 21/6254* (2013.01); *G06T 11/60* (2013.01)

(58) Field of Classification Search
CPC .............................. G06F 21/6254; G06T 11/60
See application file for complete search history.

(56) References Cited

U.S. PATENT DOCUMENTS

| | | | |
|---|---|---|---|
| 12,093,410 B1* | 9/2024 | Chavez | H04N 7/188 |
| 2024/0250950 A1* | 7/2024 | He | H04L 51/52 |
| 2024/0323022 A1* | 9/2024 | Herlands | G06F 21/6245 |
| 2025/0021695 A1* | 1/2025 | Buscemi | G06V 20/30 |
| 2025/0029379 A1* | 1/2025 | Richter | H04N 21/4524 |
| 2025/0054254 A1* | 2/2025 | Kahan | G06V 20/20 |
| 2025/0124168 A1* | 4/2025 | Paspuel | G06F 21/6245 |
| 2025/0165746 A1* | 5/2025 | Kawasaki | G06N 3/08 |
| 2025/0200215 A1* | 6/2025 | Fresle | G06F 21/6245 |
| 2025/0225275 A1* | 7/2025 | Pan | G06T 7/10 |
| 2025/0252212 A1* | 8/2025 | Kandal | G06T 11/60 |

\* cited by examiner

*Primary Examiner* — Stephen T Gundry
(74) *Attorney, Agent, or Firm* — Armstrong Teasdale LLP

(57) ABSTRACT

A system is provided. The system includes at least one processor in communication with at least one memory device that includes instructions that cause the at least one processor to: a) receive an image including a plurality of objects; b) scan the image to identify one or more privacy objects in the plurality of objects in the image, wherein each privacy object of the one or more privacy objects includes private information; c) determine a number of degrees of freedom for each privacy object of the one or more privacy objects; d) generate a replacement object based upon the number of degrees of freedom for the corresponding privacy object, wherein the replacement object resembles the privacy object with private information removed; e) replace the privacy object with the replacement object in the image; and f) generate a modified image based upon the image and the one or more replacement objects.

20 Claims, 4 Drawing Sheets

SYSTEMS AND METHODS FOR ADVANCED IMAGE-BASED PRIVACY PRESERVATION AND PROTECTION

CROSS REFERENCE TO RELATED APPLICATIONS

This application claims priority to U.S. Provisional Patent Application No. 63/437,780, filed Jan. 9, 2023, which is hereby incorporated by reference in its entirety.

BACKGROUND

The field of the invention relates generally to image-based privacy protection, and more specifically, to systems and methods for protecting individuals' privacy in images and video using artificial intelligence.

Cameras continue to have increasing resolution and can often capture frequencies that are at or near infrared. For many years cell phone cameras have been capable of capturing iris and retina scans. Additionally, images combined with machine learning can be used for at-home medical diagnoses for detecting medical issues such as heart-disease, and skin cancer.

While these innovations have clear beneficial uses, there is also a downside to all of these extremely portable and extremely powerful cameras, the images captured can be used to expose private information. Images posted of people online will be increasingly high resolution. This presents a grave privacy concern as it will expose details like iris patterns, finger and palm prints, physical key configurations among others with enough fidelity to be copied or otherwise used. This information can be mined for advertising and/or nefarious purposes. For example, an insurance company could use public images to determine the health status of an individual prior to negotiating a premium (cardiovascular/diabetes health). Advertisers could use images to target medications or products. Bad actors could use the information to impersonate the biometrics of the person or extort them based on undisclosed health conditions.

Accordingly, it would be useful to have a system that protects an individual's privacy while allowing them to share images of themselves with others.

BRIEF DESCRIPTION

A system is provided. The system includes at least one computer device including at least one processor in communication with at least one memory device. The at least one memory device includes computer instructions that cause the at least one processor to receive an image. The the image includes a plurality of objects. The computer instructions also cause the at least one processor to scan the image to identify one or more privacy objects in the plurality of objects in the image. Each privacy object of the one or more privacy objects includes private information. The computer instructions further cause the at least one processor to determine a number of degrees of freedom for each privacy object of the one or more privacy objects. For each privacy object, the computer instructions cause the at least one processor to generate a replacement object based upon the number of degrees of freedom for the corresponding privacy object. The replacement object resembles the privacy object with private information removed. For each privacy object, the computer instructions also cause the at least one processor to replace the privacy object with the replacement object in the image. In addition, the instructions cause the at least one processor to generate a modified image based upon the image and the one or more replacement objects. The system may include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
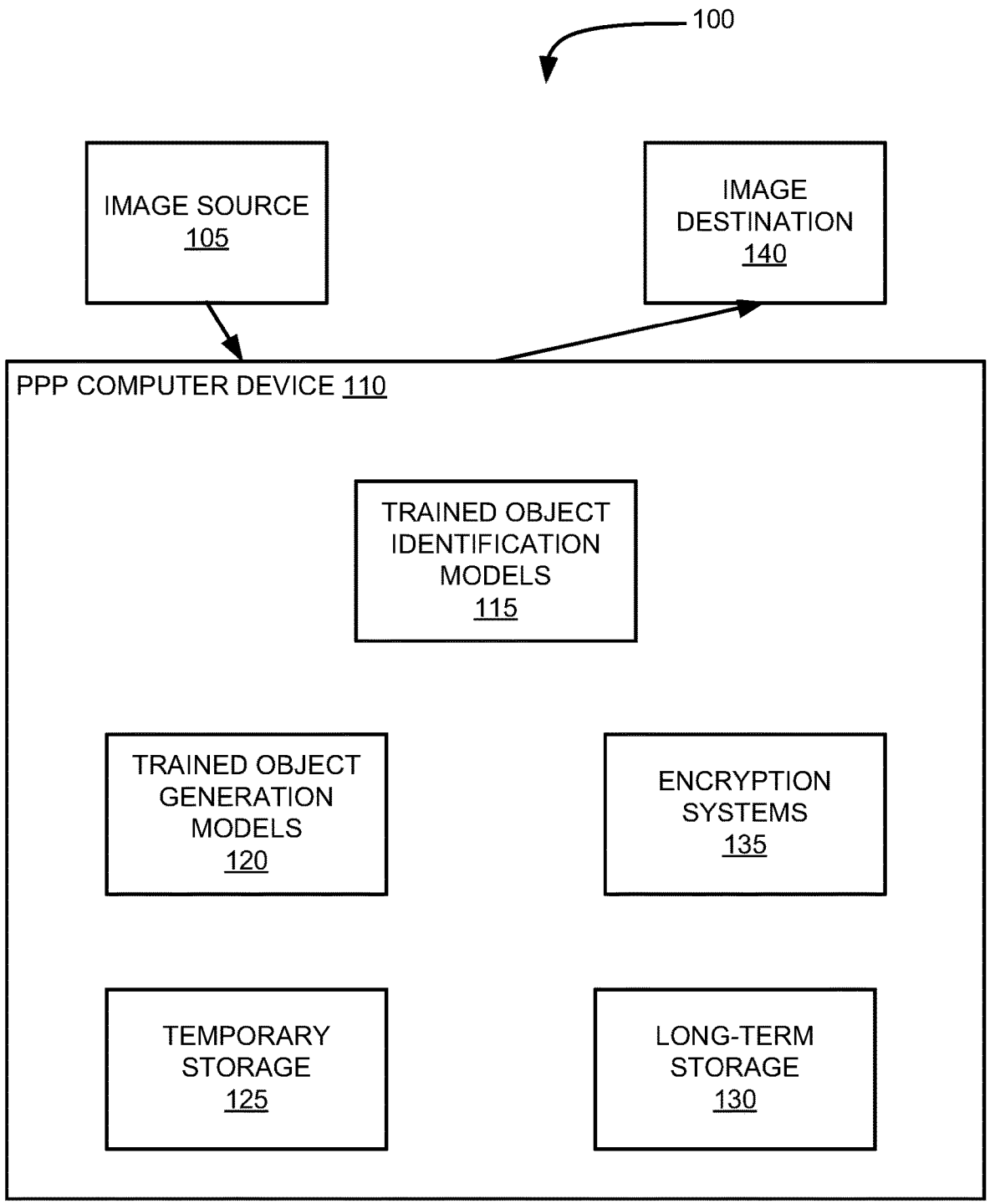
FIG. 1 illustrates an exemplary architecture for a personal privacy preserving (PPP) system, in accordance with at least one embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The field of the disclosure relates generally to image-based privacy protection, and more specifically, to systems and methods for protecting individuals' privacy in images and video using artificial intelligence. This disclosure describes a personal privacy preserving (PPP) system that uses Artificial Intelligence (AI) and/or machine learning (ML) techniques to identify privacy divulging photos and to alter them in a way that preserves the image quality while mutating the privacy sensitive aspects in a way that prevents unintended uses.

The PPP system uses a multi-step machine learning process that first identifies objects in an image that may leak private information, for example eyes (iris, retina), fingers (fingerprints), objects such as physical keys, barcodes, addresses, license plates, birthdays, social security numbers (SSNs) etc. Each identified object of the image is then ranked by the degrees of freedom for that object. Using the examples above as a guide, the degrees of freedom for an iris would be the size of the iris in pixels times the numbers of possible color combinations of those pixels. In the exemplary embodiment, the PPP system takes into account that the degrees of freedom for natural human eye do not encompass the entire color spectrum. The PPP system calculates the degrees of freedom for an iris to three standard deviations of the normal distribution of human eye color.

In the exemplary embodiment, instead of simply blurring the objects out, the PPP system replaces the data with realistic but fake data to prevent the leakage of privacy information. The goal of the PPP system is to imperceptible to the human remove identifiable or private information from the image replacing them with fake data that is unusable to computer identification processes.

In the exemplary embodiment, the PPP system receives an image. The image may be received from a camera or other sensor. The image may also be stored in computer memory, such as in a database. In some embodiments, the PPP system is a part of a social media platform and scans images when the images are being uploaded to the platform. In further embodiments, the PPP system is associated with a camera and scan images after they have been taken by the camera. For example, the PPP system may scan and alter images after the user has indicated to capture the image, but before the image is saved to persistent memory.

In the exemplary embodiment, the PPP system scans the image for personally identifiable objects. Examples of these personally identifiable objects may include, but are not limited to, eyes (iris, retina), fingers (fingerprints), objects such as physical keys, barcodes, addresses, license plates, birthdays, social security numbers (SSNs), device model numbers, device serial numbers, and/or any other personally identifiable information. The PPP system identifies the coordinates for each of the identified objects in the image that are identified and the context domain of those objects. For example, the PPP system will note the location of the pixels of for the irises, and that these are identified as irises. In some embodiments, the PPP system determines the top left pixel of the identified object and the size of the object in pixels. In other embodiments, the PPP system determines a bounding box enclosing the identified object.

In the exemplary embodiment, the PPP system ranks the objects in the images based on degrees of freedom. This informs the PPP system to the degree of perturbation required to overwrite the selected object of the image. The PPP system uses one or more trained models to rank the objects in the image to decide on the temperature (the level of creativity) to apply to specific objects. In other words, text/numerical objects may have less entropy added than say irises, fingerprints with keys being somewhere in the middle. This accounts for degrees of freedom on the input space being directly proportional to the efficacy of adversarial perturbations on the output space.

The PPP system performs data preprocessing on the specific identified objects in the image. In some embodiments, the preprocessing includes methods of feature/dimensionality reduction. The feature reduction may be domain specific. For example, once a physical key is identified in an image, edge detection algorithms can be run to identify the outline, teeth, and grooves of the key. The same preprocessing can be applied to a fingerprint to identify ridges and valleys. In some further embodiments, the PPP system may employ a well-known method of preprocessing, such as principal component analysis (PCA). PCA is used to capture variation in the data. Here the PPP system uses PCA to identify the number of principal components required to explain the cumulative variance in the object of interest. In this embodiment, the PPP system uses the number of principal components required to achieve 95% of the explained variance in the image as the rank used for degrees of freedom. More complex, higher variance images will require larger numbers of principal components to capture 95% of the explained variance. This rank will be used as a guide to the overall algorithm on the amount of computing resources needed to be spent to sufficiently alter the image.

In some further embodiments, the PPP system may use the rankings to allocate computing resources for altering the image. For example, if the source material is video, the PPP system may need to analyze each frame and modified. The PPP system then uses the ranking to determine where to spend the computational resources in modifying the images.

In the exemplary embodiment, the PPP system uses a plurality of trained models for creating variance in the identified objects. This plurality of trained models are trained for different types of objects, for example a model may be trained to modify images of keys, while others are trained for modifying irises. Each model is trained and fine-tuned to both recognize objects of interest and change those objects to preserve privacy. In some embodiments, each domain has an associated low rank adapter to improve the performance of the models.

In the exemplary embodiment, the PPP system loads a fine-tuned generative neural network for each domain specific object. This step is based upon the PPP system having a foundational model that performs image recognition and generation. These foundational models are fine-tuned to have their generatorial output to the specific domain identified for the corresponding object. Examples of this include, but are not limited to, Low Rank Adapters that have been specifically trained on irises, or one specifically trained on fingerprints, keys, etc.

In the exemplary embodiment, the PPP system generates replacements for the personally identifiable objects in the image. In some embodiments, the PPP system prioritizes this generation of objects by policy. For example, this may be based on the corresponding risk for each object. This may also be prioritized by the computational power required to generate this object for the image. In some embodiments, this includes a temperature setting that would inform the fine-tuned model that is performing the generation, how much entropy to add to the image. This setting could be automatically calculated based on the degrees of freedom, the risk policy, etc. The temperature parameter is used in AI to control the randomness of the output of a model. A lower temperature will result in more predictable output, while a higher temperature will result in more random output. The temperature parameter is set between 0 and 1, with 0 being the most predictable and 1 being the most random. For example, a key outline would have a lower temperature while an iris would have a higher temperature. To save computational resources, the PPP system may replace the outline of a key with the same outline every time or with one of a plurality of pregenerated outlines. This would require fewer resources and still provide the needed privacy.

The PPP system replaces the identified original objects of the image with the generated objects of the image. In the exemplary embodiment, the PPP system completely replaces the original pixels with the pixels of the generated objects. In some embodiments, when the objects may overlap, the PPP system combines the generated objects before adding them to the image. In other embodiments, the PPP system replaces the original objects in a reverse order of priority based upon the ranks. For example, the PPP system replaces the key object with the generated key image, which has a lower number of degrees of freedom, before replacing an iris object or fingerprint image.

In some embodiments, the PPP system stores a hash of the original image in the new metadata for the altered image. In some further embodiments, the PPP system stores a hash of the changed image in the new metadata. This hash could be encrypted using the private key of a public key infrastructure (PKI) to provide provenance of the changes.

In additional embodiments, the PPP system stores the locations and either a differential of the modifications (to save space space) or the whole set of modifications in the meta-data. This part of the meta data could be encrypted using either a public key of a PKI, or a symmetric key. This would allow authorized parties (ones that have possession of the secret key) to decrypt and restore the image to its original form with identifiers. In the case of a PKI a user's public key could be given to the service that is doing the image alteration, the PPP system could encrypt the differential metadata using this key such that only the user would be able to recover the original image.

In some embodiments, the PPP system stores the generated object to use for future replacements. For example, the PPP system may be processing a plurality of frames for a video. The PPP system may use the same replacement irises for a first person's, every time that the person is identified in the images of the video. This reduces the required resources while still preserving the privacy of the individual.

FIG. 1 illustrates an exemplary architecture for a personal privacy preserving (PPP) system 100, in accordance with at least one embodiment.

In the exemplary embodiment, the PPP system 100 receives one or more images from an image source 105. In some embodiments, the image source 105 is a camera or other sensor that captured the one or more images. In other embodiments, the image source 105 is a computer system that is currently storing the one or more images. In additional embodiments, the image source 105 is a social media platform that the one or more images are currently being uploaded to for display on the social media platform. The image source 105 could be any system that provides images to be protected. In some embodiments, the one or more images are from a video, where the images are frames of the video.

The one or more images are received by a personal privacy preserving (PPP) computer device 110 (also known as a PPP server 110). The PPP computer device 110 either includes or is in communication with a plurality of modules that allow it to perform as described herein.

In the exemplary embodiment, the PPP computer device 110 may be a computer that includes a web browser or a software application, which enables PPP computer device 110 to communicate with image sources 105 and image destinations 140 using the Internet, a local area network (LAN), or a wide area network (WAN). In some embodiments, the PPP computer device 110 may be communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. The PPP computer device 110 may be any device capable of accessing a network, such as the Internet, including, but not limited to, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), MR (mixed reality), or XR (extended reality) headsets or glasses), chatbots, voice bots, ChatGPT bots or ChatGPT-based bots, or other web-based connectable equipment or mobile devices.

The PPP computer device 110 includes one or more trained object identification models 115. In some embodiments, these models 115 are internal to the PPP computer device 110. In other embodiments, these models 115 are external to the PPP computer device 110, where the PPP computer device 110 is in communication with the models 115. In the exemplary embodiment, the models 115 are trained to identifying and/or categorize objects in the images. These objects include objects that may leak private information, for example eyes (iris, retina), fingers (fingerprints), objects such as physical keys, barcodes, addresses, license plates, birthdays, social security numbers (SSNs) etc. The models 115 recognize the objects and then identify those objects in the image including the location and category of each object. For example, the PPP computer device 110 notes the location of the pixels of for the irises, and that these are identified as irises. In some embodiments, the PPP computer device 110 determines the top left pixel of the identified object and the size of the object in pixels. In other embodiments, the PPP computer device 110 determines a bounding box enclosing the identified object.

In some embodiments, the PPP computer device 110 trains one or more of the trained object identification models 115 and the trained object generation models 120.

The PPP computer device 110 ranks each identified object of the image by the degrees of freedom for that object. Using the examples above as a guide, the degrees of freedom for an iris would be the size of the iris in pixels times the numbers of possible color combinations of those pixels. In the exemplary embodiment, the PPP system takes into account that the degrees of freedom for natural human eye do not encompass the entire color spectrum. The PPP system calculates the degrees of freedom for an iris to three standard deviations of the normal distribution of human eye color.

In the exemplary embodiment, instead of simply blurring the objects out, the PPP system replaces the data with realistic but fake data to prevent the leakage of privacy information. The goal of the PPP system 100 is to imperceptible to the human remove identifiable or private information from the image replacing them with fake data that is unusable to computer identification processes.

The PPP computer device 110 includes one or more trained object generation models 120. In some embodiments, these models 120 are internal to the PPP computer device 110. In other embodiments, these models 120 are external to the PPP computer device 110, where the PPP computer device 110 is in communication with the models 120. In the exemplary embodiment, the models 120 are trained to generate new versions of the identified objects that include randomized data rather than the private information. For example, for keys the object generation model 120 is trained to change the grooves and notches of the key so that the key may not be duplicated. For fingerprints the object generation model 120 is trained to modify the loops and swirls of the fingerprint to remove the private information, but to still look like a human fingerprint. In the exemplary embodiment, there are a plurality of models 120 that are trained to generate different objects. For example, a first model 120 is trained to generate key-based objects, while another model 120 is trained to generate fingerprints, and a further model 120 is trained to generate irises. These categories may be further divide to different models 120 based upon their corresponding degrees of freedom and other attributes of the object. For example, the models 120 include different models for different iris colors or for the fingerprints of different fingers, aka a first model 120 for the index finger and a second model for the thumb. In the exemplary embodiment, the models 120 use low rank adapters that have been specifically trained for the corresponding object.

In some embodiments, the PPP computer device 110 prioritizes the generation of objects by policy. For example, the priority may be based on the corresponding risk for each object. The priority may also be prioritized by the computational power required to generate this object for the image. These priorities may also be set by one or more user preferences. In some embodiments, the priority includes a temperature setting that would inform the fine-tuned model 120 that is performing the generation, how much entropy to add to the image. This setting could be automatically calculated based on the degrees of freedom, the risk policy, user preferences, etc. The temperature parameter is used in the models 120 to control the randomness of the output of a model 120. A lower temperature will result in more predictable output, while a higher temperature will result in more random output. The temperature parameter is set between 0 and 1, with 0 being the most predictable and 1 being the most random. For example, a key outline would have a lower temperature while an iris would have a higher temperature. To save computational resources, the PPP computer device 110 may replace the outline of a key with the same outline every time or with one of a plurality of pregenerated outlines. This would require fewer resources and still provide the needed privacy.

The PPP computer device 110 replaces the identified original objects of the image with the generated objects of the image. In the exemplary embodiment, the PPP computer device 110 completely replaces the original pixels with the pixels of the generated objects. In some embodiments, when the objects may overlap, the PPP computer device 110 combines the generated objects before adding them to the image. In other embodiments, the PPP computer device 110 replaces the original objects in a reverse order of priority based upon the ranks. For example, the PPP computer device 110 replaces the key object with the generated key image, which has a lower number of degrees of freedom, before replacing an iris object or fingerprint image.

In the exemplary embodiment, the PPP computer device 110 stores the original image and the generated objects in a secure temporary memory storage 125. This temporary storage 125 is erased on a regular basis to prevent the leak of private information. In some embodiments, the modified image is also stored in the temporary storage 125, especially when the image is being modified and the generated objects are being added to the image.

In some embodiments, the PPP computer device 110 includes a long-term storage for storing information about the image, a copy of the completed image, user preferences, and/or other information as desired.

In some further embodiments, the PPP computer device 110 also includes one or more encryption systems 135 to be used as described herein.

The PPP computer device 110 provides the final modified image to an image destination 140, such as, but not limited to, the social media platform, a computer associated with the user, a final video, etc.

In some embodiments, the PPP computer device 110 generates and stores a hash of the original image in the new metadata of the modified image. The PPP computer device could also generate and store a hash of the changed image in the new metadata. This hash could be encrypted using the private key of a PKI to provide provenance of the changes.

In some further embodiments, the PPP computer device 110 identifies and stores the locations of each of the modifications in the meta data of the modified image. The PPP computer device 110 also stores one of a differential of the modifications (to save space space) or the whole set of modifications in the meta-data. In these embodiments, this part of the meta data is encrypted by the encryption systems 135, such as by using either a public key of a PKI, or a symmetric key. This would allow authorized parties (ones that have possession of the secret key) to decrypt and restore the image to its original form. In the case of a PKI, a user's public key could be given to the service that is doing the image alteration, the PPP computer device 110 and/or the encryption systems 135 encrypt the differential metadata using this key such that only the user would be able to recover the original image.

In the exemplary embodiment, the PPP computer device 110 may be a computer that includes a web browser or a software application, which enables PPP computer device 110 to communicate with image sources 105 and image destinations 140 using the Internet, a local area network (LAN), or a wide area network (WAN). In some embodiments, the PPP computer device 110 may be communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. The PPP computer device 110 may be any device capable of accessing a network, such as the Internet, including, but not limited to, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), MR (mixed reality), or XR (extended reality) headsets or glasses), chatbots, voice bots, ChatGPT bots or ChatGPT-based bots, or other web-based connectable equipment or mobile devices.

The temporary storage 125 and the long-term storage 130 store data. In one embodiment, the temporary storage 125 and/or the long-term storage 130 may include a database that includes one or more large language models and/or interaction information. In some embodiments, the temporary storage 125 and/or the long-term storage 130 is stored remotely from the PPP computer device 110. In some embodiments, the temporary storage 125 and/or the long-term storage 130 is decentralized. In the exemplary embodiment, a person may access the temporary storage 125 and/or the long-term storage 130 via the client devices by logging onto PPP computer device 110.

Figure 2:
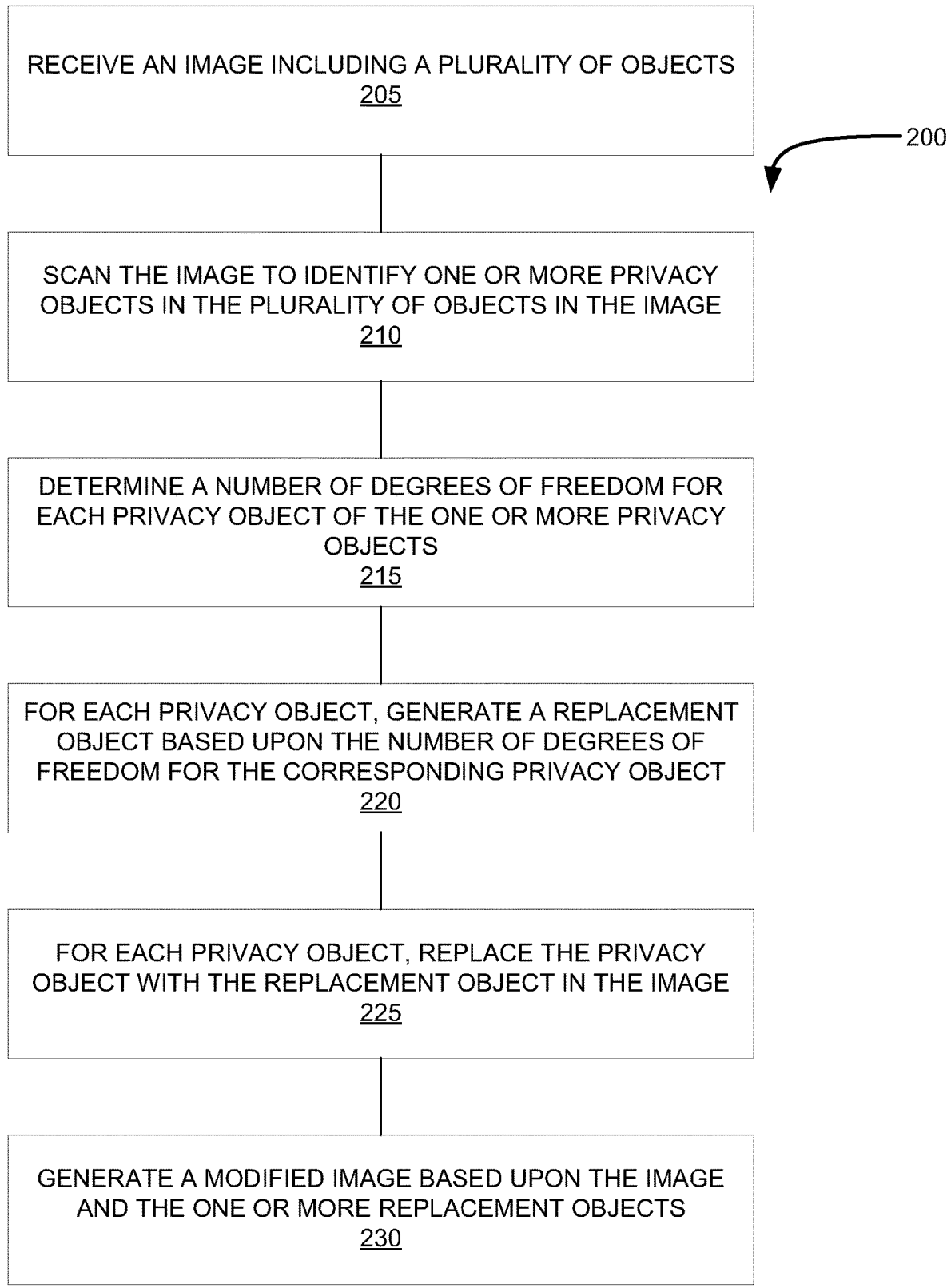
FIG. 2 is a flowchart of a process for protecting individuals' privacy in images and video using artificial intelligence, using the system shown in FIG. 1.

FIG. 2 is a flowchart of a process 200 for protecting individuals' privacy in images and video using artificial intelligence, using the system 100 (shown in FIG. 1). In the exemplary embodiment, process 200 is performed by the PPP computer device 110 (shown in FIG. 1).

In the exemplary embodiment, the PPP computer device 110 receives 205 an image. The image includes a plurality of objects that make up the image. For example, an image may include a tree, a picnic table, various picnic foods, and one or more people sitting around the picnic table. Furthermore, each person is made up of a plurality of objects, such as, but not limited to, clothing, eyes, hair, hands, fingers, etc. In the exemplary embodiment, the PPP computer device 110 receives 205 the image from an image source 105. The image may include a single image, a plurality of images, and/or a video where the frames are the images that make up the video.

In the exemplary embodiment, the PPP computer device 110 scans 210 the image to identify one or more privacy objects in the plurality of objects in the image. Each privacy object of the one or more privacy objects includes private information. The PPP system 100 includes one or more object recognition models trained to recognize and categorize privacy objects in images. In the exemplary embodiment, the PPP computer device 110 executes one or more trained object identification models 115 with the image as input. The trained object identification models 115 analyze the image to identify any privacy objects in the image. Privacy objects are parts or portions of the image that may have privacy information. Examples of privacy objects include, but are not limited to, eyes (iris, retina), fingers (fingerprints), objects such as physical keys, barcodes, addresses, license plates, birthdays, social security numbers (SSNs) etc. The trained object identification models 115 report the location and classification of each of the identified trained objects. In some embodiments, the trained object identification models 115 are each trained to identify specific types of objects. In other embodiments, a trained object identification model 115 is trained to identify all of the looked for privacy objects.

In some embodiments, the PPP computer device 110 identifies a location of each privacy object. The location includes a location of a plurality of pixels that make up the privacy object. In some embodiments, the PPP computer device 110 determines the top left pixel of the identified object and the size of the object in pixels. In other embodiments, the PPP computer device 110 determines a bounding box enclosing the identified object.

In the exemplary embodiment, the PPP computer device 110 determines 215 a number of degrees of freedom for each privacy object of the one or more privacy objects. Using the examples above as a guide, the degrees of freedom for an iris would be the size of the iris in pixels times the numbers of possible color combinations of those pixels. In the exemplary embodiment, the PPP computer device 110 takes into account that the degrees of freedom for natural human eye do not encompass the entire color spectrum. The PPP computer device 110 calculates the degrees of freedom for an iris to three standard deviations of the normal distribution of human eye color.

Degrees of freedom generally represents the number of points of control of a system. In statistics, degrees of freedom is the number of observations used to calculate a statistic. In some embodiments, as used herein for machine learning, the degrees of freedom may be considered the number of parameters of a model.

In the exemplary embodiment, for each privacy object, the PPP computer device 1110 generates 220 a replacement object based upon the number of degrees of freedom for the corresponding privacy object. The replacement object resembles the privacy object with private information removed. The PPP system 100 includes a plurality of object generation models each trained to generate modified objects of the privacy objects. In some categories, the plurality of object generation models 120 are each trained to generate modified objects for different categories of privacy objects. In the exemplary embodiment, the PPP computer device 110 executes one or more trained object generation models 120 with the privacy object as input. The trained object generation models 120 analyze the privacy object and generate a replacement object for the privacy objects, where the replacement object does not include the privacy information. The trained object generation models 120 generate replacement objects that have the privacy information change to prevent reverse engineering or recreating the privacy information in the original object.

Instead of blurring the image, the replacement object includes many of the features or the original object and would be considered the same as the original object from a viewing aspect, but not the same from an information aspect. For example, in a fingerprint, the loops and whorls may have different shapes, different locations, different distribution, and different ratios. In a key, the edges of the key would have been modified. In an iris, the individual details, such as the placement and shape of the freckles in the ciliary zone and/or the shape and coloration of the collarette.

In the exemplary embodiment, for each privacy object, the PPP computer device 110 replaces 225 the privacy object with the replacement object in the image. In the exemplary embodiment, the PPP computer device 110 directly replaces the pixels in the original image with the pixels for the replacement object. If the objects have different ranks, then the lowest ranked replacement object is placed first and then in ascending order.

In the exemplary embodiment, the PPP computer device 110 generates 230 a modified image based upon the image and the one or more replacement objects. The PPP computer device 110 provides the modified image to the image destination 140. The PPP computer device 110 may also save the modified image to long-term storage 130.

In some embodiments, the privacy object includes an iris of an eye. The replacement object is a modified object of a pattern of the iris modified based on the number of degrees of freedom. The pattern of the iris of the modified object is identifiable as an iris pattern.

In some embodiments, the privacy object includes a fingerprint. The replacement object is a modified object of the fingerprint with modified loops and swirls. The modified object of the fingerprint is identifiable as a fingerprint.

In some further embodiments, the PPP computer device 110 ranks each privacy object of the image by the number of degrees of freedom for that privacy object. The PPP computer device 110 determines whether or not to generate a modified object for the privacy object based upon the rankings. The PPP computer device 110 determines how many computer resources to dedicate to generating a modified object for the privacy object based upon the rankings. For example, for a key, the PPP computer device 110 may select the replacement object for the key from one or more predetermined key outlines. The PPP computer device 110 may also determine the computer resources based upon one or more user preferences. For example, the user may prioritize iris replacement over key and fingerprint replacement.

In some embodiments, the PPP computer device 110 generates a hash of the original image using a chosen hashing algorithm. The PPP computer device 110 stores the hash of the original image in metadata for the modified image.

In some further embodiments, the PPP computer device 110 generates a hash of the modified image. Then the PPP computer device 110 stores the hash of the modified image in metadata for the modified image. In additional embodiments, the PPP computer device 110 stores a listing of locations of modified objects in metadata for the modified image. The PPP computer device 110 can also store a differential of the privacy objects and the replacement objects in the metadata for the modified image. The differential is then encrypted. In still further embodiments, the PPP computer device 110 stores the privacy objects and the replacement objects in the metadata for the modified image, wherein the privacy objects and the replacement objects are encrypted. This part of the meta data could be encrypted using either a public key of a PKI, or a symmetric key. This would allow authorized parties (ones that have possession of the secret key) to decrypt and restore the image to its original form with identifiers. In the case of a PKI a user's public key could be given to the service that is doing the image alteration, the PPP system could encrypt the differential metadata using this key such that only the user would be able to recover the original image.

In some embodiments, the PPP computer device 110 stores the generated object to use for future replacements. For example, the PPP computer device 110 may be processing a plurality of frames for a video. The PPP computer device 110 may then use the same replacement irises for a first person's, every time that the person is identified in the images of the video. This reduces the required resources while still preserving the privacy of the individual.

Figure 3:
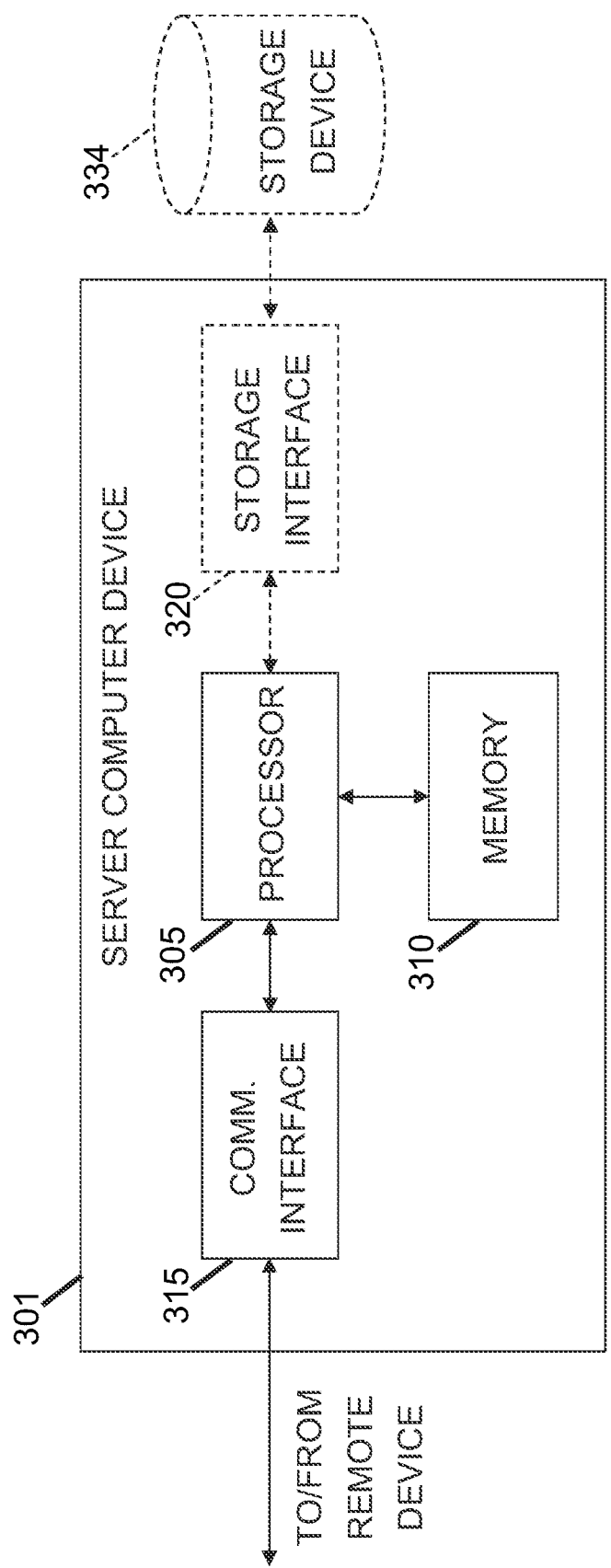
FIG. 3 depicts an exemplary configuration of a server computer device, in accordance with one embodiment of the present disclosure.

FIG. 3 depicts an exemplary configuration 300 of a server computer device 301, in accordance with one embodiment of the present disclosure. In the exemplary embodiment, server computer device 301 may be similar to, or the same as, image source 105, PPP computer device 110, and image destination (all shown in FIG. 1). Server computer device 301 may also include a processor 305 for executing instructions. Instructions may be stored in a memory area 310. Processor 305 may include one or more processing units (e.g., in a multi-core configuration).

Processor 305 may be operatively coupled to a communication interface 315 such that server computer device 301 is capable of communicating with a remote device such as another server computer device 301, PPP computer device 110, trained object identification models 115, trained object generation models 120, and encryption systems 135 (all shown in FIG. 1) (for example, using wireless communication or data transmission over one or more radio links or digital communication channels). For example, communication interface 315 may images from image source 105 via the Internet, as illustrated in FIG. 1.

Processor 305 may also be operatively coupled to a storage device 334. Storage device 334 may be any computer-operated hardware suitable for storing and/or retrieving data, such as, but not limited to, data associated with one or more models. In some embodiments, storage device 334 may be integrated in server computer device 301. For example, server computer device 301 may include one or more hard disk drives as storage device 334.

In other embodiments, storage device 334 may be external to server computer device 301 and may be accessed by a plurality of server computer devices 301. For example, storage device 334 may include a storage area network (SAN), a network attached storage (NAS) system, and/or multiple storage units such as hard disks and/or solid-state disks in a redundant array of inexpensive disks (RAID) configuration.

In some embodiments, processor 305 may be operatively coupled to storage device 334 via a storage interface 320. Storage interface 320 may be any component capable of providing processor 305 with access to storage device 334. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 334.

Processor 305 may execute computer-executable instructions for implementing aspects of the disclosure. In some embodiments, the processor 305 may be transformed into a special purpose microprocessor by executing computer-executable instructions or by otherwise being programmed. For example, the processor 305 may be programmed with the instruction such as illustrated in FIG. 2.

Figure 4:
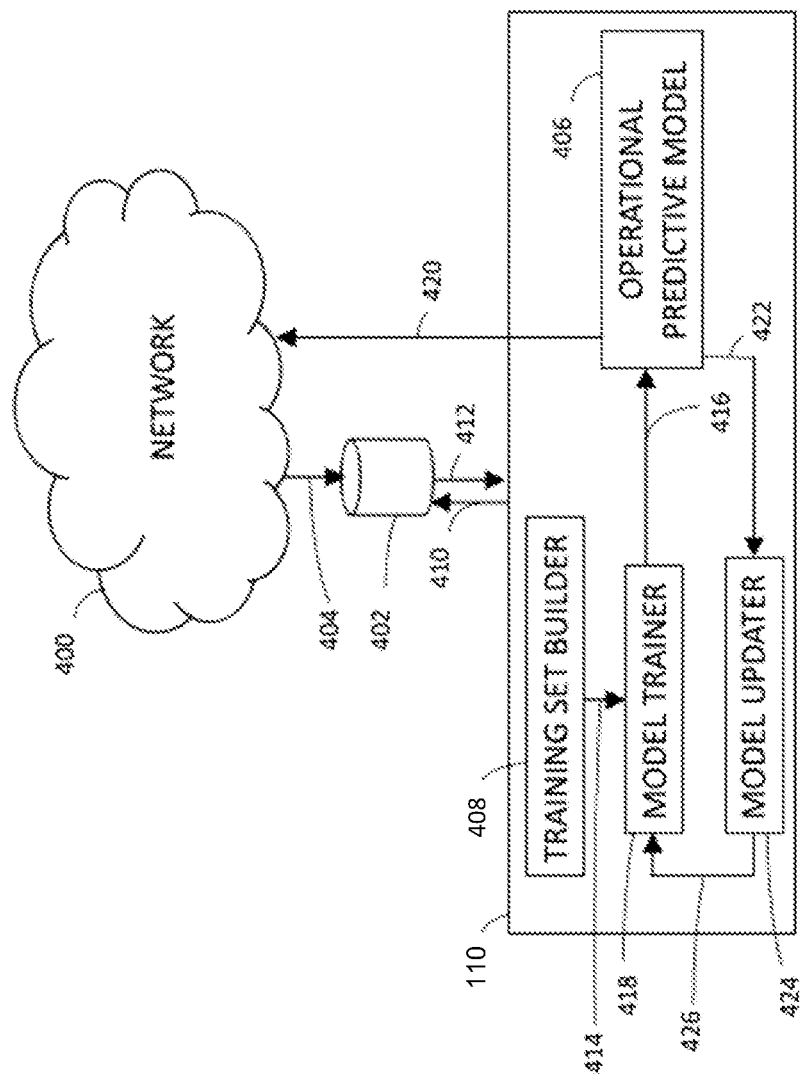
FIG. 4 is a schematic diagram of an exemplary personal privacy preserving (PPP) server shown in FIG. 1, that may be used with the system shown in FIG. 1.

FIG. 4 is a schematic diagram of an exemplary personal privacy preserving (PPP) server 110 (shown in FIG. 1), that may be used with the system 100 (shown in FIG. 1). PPP server 110 may communicate with other components of system 100, such as, but not limited to, image sources 105, image destinations 140, trained object identification models 115, trained object generation models 120, temporary storage 125, long-term storage 130, and/or encryption systems 135 (all shown in FIG. 1), via a network.

PPP server 110 may include and/or be in communication with a database 402 that stores data 404, such as storage device 334 (shown in FIG. 3), stored records generated by PPP server 110, and/or any other relevant data as described herein. Data 404 received from network 400 may be stored in database 402. PPP server 110 may configured to use data 404 to generate one or more models 406 for controlling operations of PPP server 110 (e.g., in accessing third-party databases via a digital portal), identifying objects, generating replacement objects, and the like.

In exemplary embodiments, PPP server 110 may include a training set builder module 408 configured to submit one or more queries 410 to database 402 to retrieve subsets 412 of data 404, and to use those subsets 412 to build training data sets 414 for generating operational models 406. For example, query 410 may be configured to retrieve certain fields from data 404 for specific information, specific object, specific risk factors, specific degrees of freedom, user preferences, and/or any other division of factors desired by the user and/or for privacy compliance, such as with a government entity.

In various embodiments, training set builder module 408 may be configured to derive training data sets 414 from retrieved subsets 412. Each training data set 414 corresponds to a historical data 404 ("historical" in this context means completed in the past, as opposed to completed in real-time with respect to the time of retrieval). Each training data set 414 may include "model input" data fields along with at least one "result" data field representing a historical outcome associated with the model input. The model input data fields represent factors that may be expected to, or unexpectedly be found during model training to, have some correlation.

In exemplary embodiments, the model input data fields in training data sets 414 may be generated from data fields in subset 412 corresponding to historical data 404. In other words, a trained machine learning model 416 produced by a model trainer module 418 for use by operational predictive model module 406 is trained to make predictions based upon input values that can be generated from the data fields in data 404. Values in the model input data fields may include values copied directly from values in a corresponding data field in the retrieved subset 412, and/or values generated by modifying, combining, or otherwise operating upon values in one or more data fields in the retrieved subset 412. The use of such data fields as model input data fields facilitates the machine learning model in weighing these factors directly.

After training set builder module 408 generates training data sets 414, training set builder module 408 passes the training data sets 414 to model trainer module 418. In certain embodiments, model trainer module 418 may be configured to apply the model input data fields of each training data set 414 as inputs to one or more machine learning models. Each of the one or more machine learning models may be programmed to produce, for each training data set 414, at least one output intended to correspond to, or "predict," a value of the at least one result data field of the training data set 414. "Machine learning" refers broadly to various algorithms that may be used to train the model to identify and recognize patterns in existing data in order to facilitate making predictions for subsequent new input data.

Model trainer module 418 may be configured to compare, for each training data set 414, the at least one output of the model to the at least one result data field of the training data set 414, and apply a machine learning algorithm to adjust parameters of the model in order to reduce the difference or "error" between the at least one output and the corresponding at least one result data field. In this way, model trainer module 418 trains the machine learning model to accurately predict the value of the at least one result data field.

In other words, model trainer module 418 cycles the one or more machine learning models through the training data sets 414, causing adjustments in the model parameters, until the error between the at least one output and the at least one result data field falls below a suitable threshold, and then uploads at least one trained machine learning model 416 to operational models 406 for application to generating classifications and/or replacement objects 420. In exemplary embodiments, model trainer module 418 may be configured to simultaneously train multiple candidate machine learning models and to select the best performing candidate for each result data field, as measured by the "error" between the at least one output and the corresponding result data field, to upload to operational predictive model module 406.

In certain embodiments, the one or more machine learning models may include one or more neural networks, such as a convolutional neural network, a deep learning neural network, or the like. The neural network may have one or more layers of nodes, and the model parameters adjusted during training may be respective weight values applied to one or more inputs to each node to produce a node output. In other words, the nodes in each layer may receive one or more inputs and apply a weight to each input to generate a node output. The node inputs to the first layer may correspond to the model input data fields, and the node outputs of the final layer may correspond to the at least one output of the model, intended to predict the at least one result data field. One or more intermediate layers of nodes may be connected between the nodes of the first layer and the nodes of the final layer.

As model trainer module 418 cycles through the training data sets 414, model trainer module 418 applies a suitable backpropagation algorithm to adjust the weights in each node layer to minimize the error between the at least one output and the corresponding result data field. In this fashion, the machine learning model is trained to produce output that reliably predicts the corresponding result data field. Alternatively, the machine learning model may have any suitable structure.

In some embodiments, model trainer module 418 may provide an advantage by automatically discovering and properly weighting complex, second- or third-order, and/or otherwise nonlinear interconnections between the model input data fields and the at least one output. Absent the machine learning model, such connections are unexpected and/or undiscoverable by human analysts.

The PPP server 110 of the present disclosure may be configured to operate on input data related to images including analyzing the pixels of images to determine proper classifications of objects in those images. In one exemplary embodiment, PPP server 110 executes the operational models 406 programmed to learn, without limitation, different techniques for identifying objects and generating replacement objects.

To facilitate this learning, PPP server 110 may include one or more databases 402 at which the data, including data as well as objects, classifications, replacement objects, privacy information, etc., is stored. This data becomes one or more input training sets used by the training set builder module 408. Model outputs can be formatted for presentation or review as images or portions of images, and the like.

In exemplary embodiments, operational models 406 may compare feedback, and may route a comparison result 422 generated by comparing classifications and/or replacement objects 420 to the feedback to a model updater module 424 of PPP server 110. Model updater module 424 is configured to derive a correction signal 426 from comparison results 422 received for one or more replacement objects, and to provide correction signal 426 to model trainer module 418 to enable updating or "re-training" of the at least one machine learning model to improve performance. The retrained at least one machine learning model 416 may be periodically re-uploaded to operational models 406.

Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

In some embodiments, PPP server 110 is configured to implement machine learning, such that PPP server 110 "learns" to analyze, organize, and/or process data without being explicitly programmed. Machine learning may be implemented through machine learning methods and algorithms ("ML methods and algorithms"). In an exemplary embodiment, a machine learning module ("ML module") is configured to implement ML methods and algorithms.

In some embodiments, ML methods and algorithms are applied to data inputs and generate machine learning outputs ("ML outputs"). Data inputs may include but are not limited to images. ML outputs may include, but are not limited to identified objects, items classifications, and/or other data extracted from the images. In some embodiments, data inputs may include certain ML outputs.

In certain embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, the ML module employs supervised learning, which involves identifying patterns in existing data to make predictions about subsequently received data. Specifically, the ML module is "trained" using training data, which includes example inputs and associated example outputs. Based upon the training data, the ML module may generate a predictive function which maps outputs to inputs and may utilize the predictive function to generate ML outputs based upon data inputs. The example inputs and example outputs of the training data may include any of the data inputs or ML outputs described above. In the exemplary embodiment, a processing element may be trained by providing it with a large sample of images with known characteristics or features. Such information may include, for example, information associated with a plurality of images of a plurality of different objects, items, and/or property.

In another embodiment, a ML module may employ unsupervised learning, which involves finding meaningful relationships in unorganized data. Unlike supervised learning, unsupervised learning does not involve user-initiated training based upon example inputs with associated outputs. Rather, in unsupervised learning, the ML module may organize unlabeled data according to a relationship determined by at least one ML method/algorithm employed by the ML module. Unorganized data may include any combination of data inputs and/or ML outputs as described above.

In yet another embodiment, a ML module may employ reinforcement learning, which involves optimizing outputs based upon feedback from a reward signal. Specifically, the ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

In some embodiments, generative artificial intelligence (AI) models (also referred to as generative machine learning (ML) models) may be utilized with the present embodiments and may the voice bots or chatbots discussed herein may be configured to utilize artificial intelligence and/or machine learning techniques. For instance, the voice or chatbot may be a ChatGPT chatbot. The voice or chatbot may employ supervised or unsupervised machine learning techniques, which may be followed by, and/or used in conjunction with, reinforced or reinforcement learning techniques. The voice or chatbot may employ the techniques utilized for ChatGPT. The voice bot, chatbot, ChatGPT-based bot, ChatGPT bot, and/or other bots may generate audible or verbal output, text or textual output, visual or graphical output, output for use with speakers and/or display screens, and/or other types of output for user and/or other computer or bot consumption.

Based upon these analyses, the processing element may learn how to identify characteristics and patterns that may then be applied to analyzing and classifying objects. The processing element may also learn how to identify attributes of different objects in different lighting. This information may be used to determine which classification models to use and which classifications to provide.

The computer-implemented methods discussed herein may include additional, fewer, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

The aspects described herein may be implemented as part of one or more computer components such as a client device and/or one or more back-end components, such as a cloud service server, for example. Furthermore, the aspects described herein may be implemented as part of computer network architecture and/or a cognitive computing architecture that facilitates communications between various other devices and/or components. Thus, the aspects described herein address and solve issues of a technical nature that are necessarily rooted in computer technology.

Furthermore, the embodiments described herein improve upon existing technologies, and improve the functionality of computers, by improving the security of provisioning devices and preventing their access to the network before they are fully provisioned. The present embodiments improve the speed, efficiency, and accuracy in which such calculations and processor analysis may be performed. Due to these improvements, the aspects address computer-related issues regarding efficiency over conventional techniques. Thus, the aspects also address computer related issues that are related to computer security, for example.

Accordingly, the innovative systems and methods described herein are of particular value within the realm of secure Internet communications. The present embodiments enable more reliable security during the device provisioning process, but without compromising data and speed. Furthermore, according to the disclosed techniques, user computer devices are better able to ensure the security of websites and other connected devices, and thereby protecting computer devices from malicious actors.

Exemplary embodiments of systems and methods for provisioning devices are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising at least one computer device comprising at least one processor in communication with at least one memory device, wherein the at least one memory device includes computer instructions that cause the at least one processor to:
   receive an image, wherein the image includes a plurality of objects;
   scan the image to identify one or more privacy objects in the plurality of objects in the image, wherein each privacy object of the one or more privacy objects includes private information;
   determine a number of degrees of freedom for each privacy object of the one or more privacy objects;
   for each privacy object, generate a replacement object based upon the number of degrees of freedom for the corresponding privacy object, wherein the replacement object resembles the privacy object with private information removed;
   for each privacy object, replace the privacy object with the replacement object in the image; and
   generate a modified image based upon the image and the one or more replacement objects.

2. The system of claim 1, wherein the privacy object includes an iris of an eye.

3. The system of claim 2, wherein the replacement object includes a modified object of a pattern of the iris modified based on the number of degrees of freedom.

4. The system of claim 3, wherein the pattern of the iris of the modified object is identifiable as an iris pattern.

5. The system of claim 1, wherein the privacy object includes a fingerprint.

6. The system of claim 5, wherein the replacement object includes a modified object of the fingerprint with modified loops and swirls.

7. The system of claim 6, wherein the modified object of the fingerprint is identifiable as a fingerprint.

8. The system of claim 1, wherein the computer instructions further cause the at least one processor to identify a location of the privacy object, wherein the location includes a location of a plurality of pixels that make up the privacy object.

9. The system of claim 1, wherein the computer instructions further cause the at least one processor to rank each privacy object of the image by the number of degrees of freedom for that privacy object.

10. The system of claim 9, wherein the computer instructions further cause the at least one processor to determine whether or not to generate a modified object for the privacy object based upon the rankings.

11. The system of claim 9, wherein the computer instructions further cause the at least one processor to determine how many computer resources to dedicate to generating a modified object for the privacy object based upon the rankings.

12. The system of claim 1, wherein the system further comprises one or more object recognition models trained to recognize and categorize privacy objects in images.

13. The system of claim 1, wherein the system further comprises a plurality of object generation models each trained to generate modified objects of the privacy objects.

14. The system of claim 13, wherein the plurality of object generation models are each trained to generate modified objects for different categories of privacy objects.

15. The system of claim 1, wherein the image is from a video and the system is configured to process a plurality of frames of the video.

16. The system of claim 1, wherein the computer instructions further cause the at least one processor to:
generate a hash of the original image; and
store the hash of the original image in metadata for the modified image.

17. The system of claim 1, wherein the computer instructions further cause the at least one processor to:
generate a hash of the modified image; and
store the hash of the modified image in metadata for the modified image.

18. The system of claim 1, wherein the computer instructions further cause the at least one processor to store a listing of locations of modified objects in metadata for the modified image.

19. The system of claim 18, wherein the computer instructions further cause the at least one processor to store a differential of the privacy objects and the replacement objects in the metadata for the modified image, wherein the differential is encrypted.

20. The system of claim 18, wherein the computer instructions further cause the at least one processor to store the privacy objects and the replacement objects in the metadata for the modified image, wherein the privacy objects and the replacement objects are encrypted.

* * * * *